March 28, 1944. O. F. MACLAREN ET AL 2,345,405
AIRCRAFT ALIGHTING GEAR
Filed Oct. 6, 1941 5 Sheets-Sheet 1

Inventors:-
O. F. MacLaren
L. E. Baynes
By: Stevens & Davis
Attys.

March 28, 1944. O. F. MACLAREN ET AL 2,345,405
AIRCRAFT ALIGHTING GEAR
Filed Oct. 6, 1941 5 Sheets-Sheet 2

Inventors:-
O. F. MacLaren
E. L. Baynes
By Stevens & Davis
Attys.

March 28, 1944.　O. F. MACLAREN ET AL　2,345,405
AIRCRAFT ALIGHTING GEAR
Filed Oct. 6, 1941　5 Sheets-Sheet 5

Inventors:-
O. F. MacLaren
L. E. Baynes
By: Stevens & Davis
Attys.

Patented Mar. 28, 1944

2,345,405

UNITED STATES PATENT OFFICE 2,345,405

AIRCRAFT ALIGHTING GEAR

Owen Finlay Maclaren and Leslie Everett Baynes, London, England, assignors to Maclaren Undercarriage Company Limited, London, England Application October 6, 1941, Serial No. 413,888
In Great Britain June 15, 1940

5 Claims. (Cl. 244—50)

This invention relates to aircraft alighting gear.

In the prior United States Patent No. 2,222,850 there has been described an arrangement of aircraft alighting gear in which provision is made for setting the landing elements in parallel tracks and for holding them in such setting so as to enable cross wind landing or take-off to be performed.

It is desirable that the pilot should be relieved of the responsibility of having to compute the drift angle and subsequent setting of the landing elements in the intended running direction with respect to the ground.

The main object of the present invention is to provide means whereby the setting of the landing elements is achieved automatically during the initial stage of a landing operation, and having set themselves the landing elements are then locked in position, subject to the provision of an overriding control, for instance on a tail or nose landing element as foreshadowed in the aforesaid prior specification, to steer the aircraft while it is taxiing.

The present invention consists in aircraft alighting gear having landing elements directionally settable in parallel relationship for cross wind landing, wherein the settable landing elements are freely settable during an initial stage of contact with a landing surface to take up a directional setting in accordance with the direction of taxiing travel, and thereafter to be locked in that setting. The locking is preferably effected automatically, and in preferred constructions involves a hydraulic lock constituted by a part of a hydraulic system which is remotely controllable for setting the landing elements for a cross winding take-off.

In order that it may be clearly understood and readily carried into effect, the invention is hereinafter described with reference to the accompanying diagrammatic drawings, of which:

Figure 1 is a diagrammatic view of a hydraulic control system for controlling aircraft alighting gear in accordance with the present invention—the landing elements in this case being set for take-off with port drift relative to the longitudinal axis of the aircraft;

Figure 2 corresponds to Figure 1 but shows the circuit set to permit take-off with starboard drift;

Figure 3 shows an arrangement according to the present invention in which the manual control operable to set the landing elements for take-off has been rendered inoperative, and in which the steering jacks controlling the various landing elements are freely communicating in a closed circuit to permit the landing elements to swing angularly whilst maintaining parallelism during the initial part of a landing operation;

Figure 1:
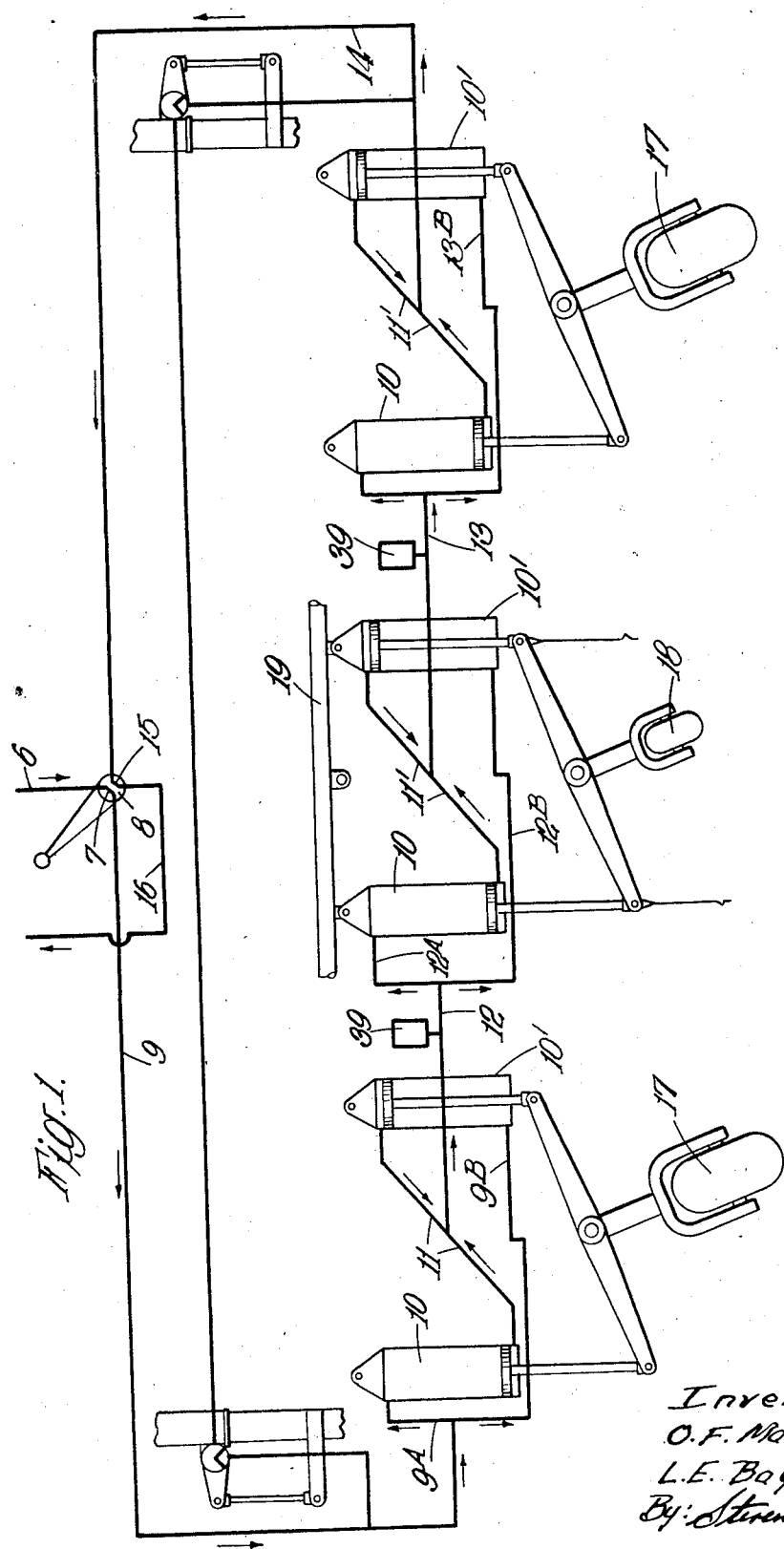
Figure 2:
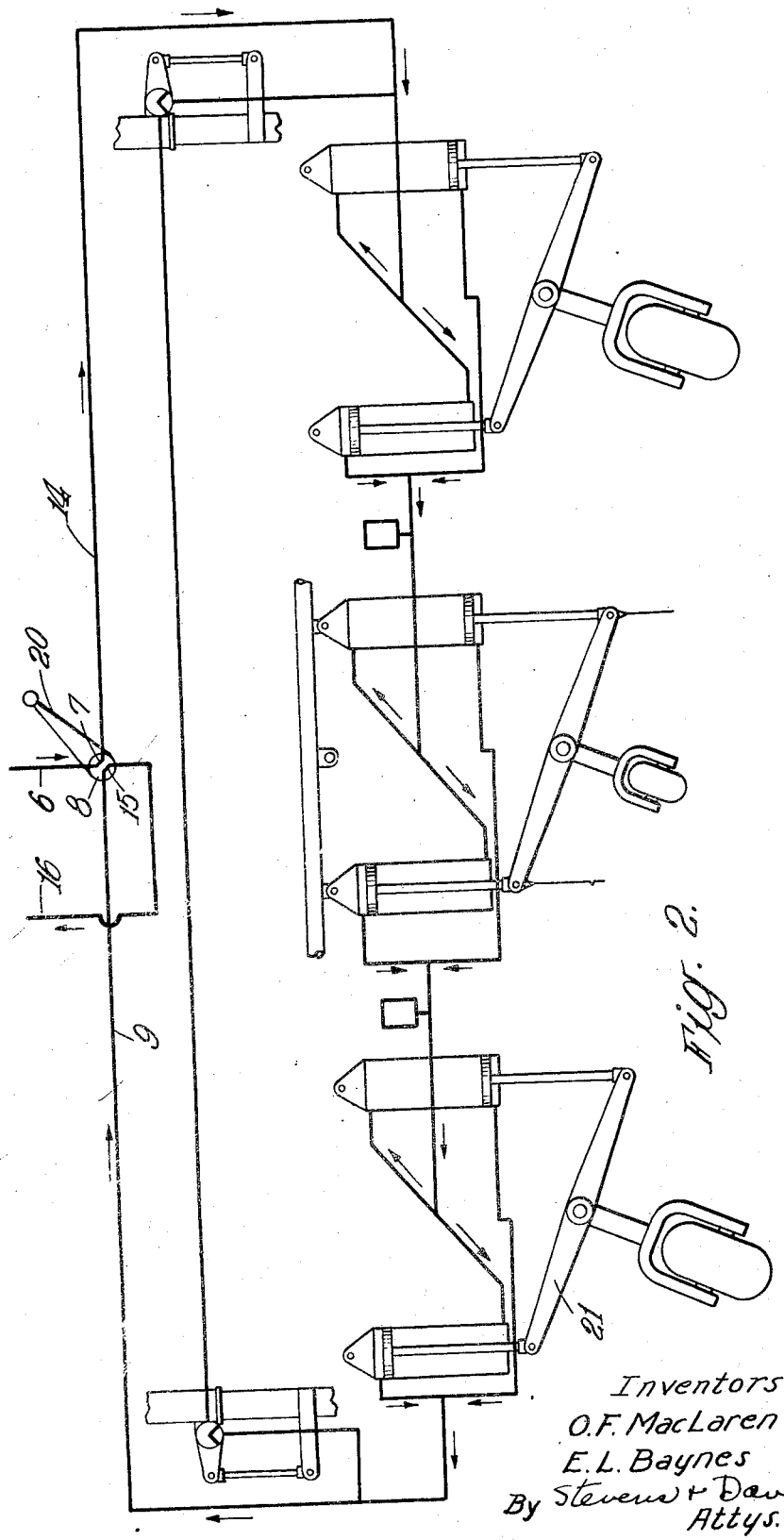

Referring now to the drawings, Figures 1 and 2 are mainly of significance when the aircraft is grounded and the pilot requires to set the landing elements for a cross wind take-off. As shown in Figure 1, the pipeline 6 communicates through the port 7 of the manual control valve 8 with the pipeline 9 and branches 9A and 9B to the steering jacks 10 and 10'. The conduit 11 connects the jacks 10 and 10' and the branch 12 connects to the conduits 12A and 12B associated with the second set of jacks 10 and 10'. Again, a conduit 11' connects the second set of jacks 10 and 10' and the conduit 13 leads to the branches 13A and 13B of the third set of jacks 10 and 10', which are connected by the conduit 11'. From the branch 11'' there extends the return conduit 14 which communicates through the port 15 of the manual control lever 8 with the conduit 16 running back to the pump or reservoir of the fluid pressure system.

The arrows shown about the circuit indicate the direction of flow at the various points, and the sets of jacks are each operatively connected to landing elements shown diagrammatically, of which the elements 17 may be regarded as main undercarriage wheels, whereas the central landing element 18 may be either a nose wheel or tail wheel with an overriding steering control.

Where an overriding steering control is provided for the auxiliary landing element 18, it can be achieved by coupling the rudder bar 19, which may be the existing rudder bar control of the aircraft, or an additional member which follows accurately the movement of the existing rudder bar, to the jacks controlling the auxiliary steerable landing element 18. The steering control is required only when the aircraft is taxiing, in which condition it will be realised from the subsequent description that a hydraulic lock is provided between the jacks 10 and 10', and consequently the jacks associated with the steerable landing element 18 then provide a solid link connection capable of transmitting the overriding steering control loads.

Figure 2 differs from Figure 1 only in that the manual control lever 20 has been set in the reverse sense, so that instead of the port 7 of the manually controlled valve 8 establishing connection between the fluid pressure supply line 6 and the jack conduit 9, it connects between the fluid pressure supply line 6 and the conduit 14, with the result that flow in the system is in the reverse sense, and consequently the landing elements are set to accommodate starboard drift as distinct from the port drift setting of Figure 1. Setting of the control valve to the position shown in Figure 2 naturally results in putting the port 15 into communication between the conduit 9 and the fluid return conduit 16, cutting off the original communication between the conduits 14 and 16, as shown in Figure 1.

It may be here stated that the connection between the jacks 10, 10' and the associated landing elements controlled by the jacks may be achieved in any desired manner. Thus, there may be a cable connection extending from the jack plungers, or the cross bar 21 connecting the jack plungers may pivot about the steering axis of the landing element.

It should also be understood that although the landing elements have been diagrammatically illustrated as wheels, they may be endless track landing elements, or skis, floats, et cetera.

Figure 3:
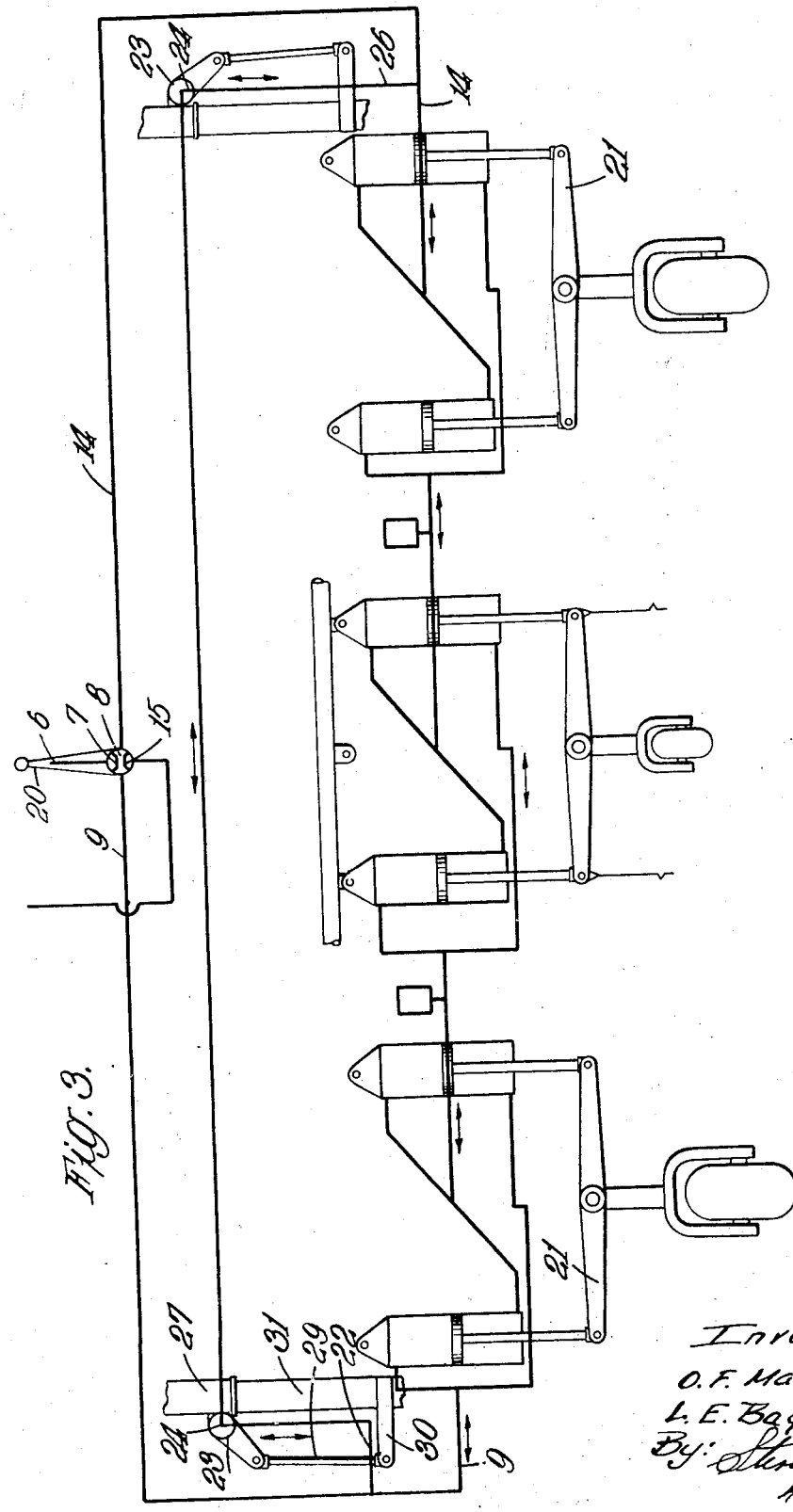

Turning now to Figure 3, it will be seen that the manual control lever 20 has been so set that the ports 7 and 15 of the valve 8 are out of registry with the conduits 6, 9 and 14. On the other hand, it will be seen that the conduit 22 connects through a valve 23 having a port 24 with a conduit 25 connected to a second and similar valve 23 having also a port 24. Fluid flowing through the second port 24 runs along the conduit 26 into the conduit 14, into the jack circuit, and at the other end of the jack circuit the conduit 22 connects with the conduit 9.

The valves 23 are each carried by the non-yielding part 27 of the main undercarriage legs. From the valve 23 there extends an actuating lever 28 which is coupled by the connecting link 29 with the bracket 30 extending from the yieldable leg part 31. The arrangement is such that when the main undercarriage is unloaded, as it is when extended ready for landing, the ports 24 are set as shown in Figure 3 to establish communication between the conduits 22, 25 and 26. It thus follows that in that setting fluid can circulate in the closed circuit constituted by the conduits 9, 22, port 24, conduit 25, second port 24, and the conduits 26 and 14, and then through the jack circuit, which has been sufficiently described with reference to Figures 1 and 2. Actuating fluid cannot flow from the conduits 9 and 14 to and from the pump or reservoir because the setting of the valve 8 closes off the conduits 9 and 14.

Due to the free circulation of fluid in the closed circuit above described it follows that the landing elements are free to castor, it being of course assumed that the landing elements are mounted for castoring; while, furthermore, due to the series connection of the pairs of jacks it will be realised that despite their castoring action the landing elements maintain their initial parallel relationship.

In connection with the castoring action, it may be stated that castoring restraint may be provided by fluid damping mechanism, spring-loading, or other well known means; while, again, especially where the undercarriage is retractable, self-centering means may be provided to ensure centralisation of the landing elements in the true fore-and-aft sense when the aircraft becomes airborne so that retraction will not be impeded by the landing elements fouling the usual recesses provided for their stowage in the aircraft.

Figure 4:
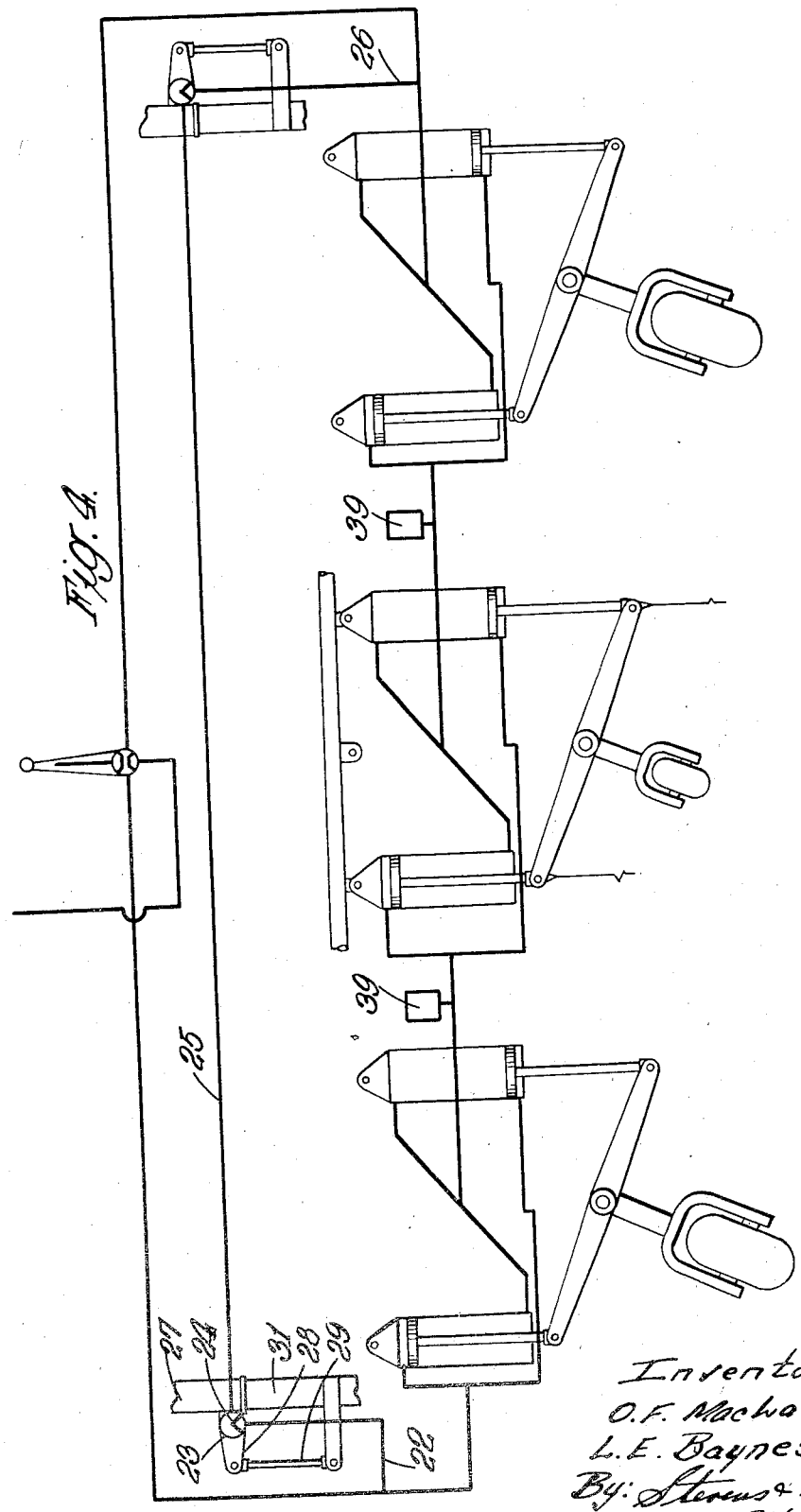
Figure 4 is like Figure 3 but shows the parts in a position which automatically results subsequent to the initial stage of landing—it being assumed in this case that the landing elements have automatically set themselves for landing with drift to starboard.

Coming now to Figure 4, it will be seen that whereas Figure 3 shows the system arranged to afford free castoring during the initial stage of landing, Figure 4 shows the parts in the condition they assume subsequent to the initial stage of landing. In this subsequent stage the yieldable leg part 31 has moved up with respect to the fixed part 27, with the result that the valve 23 has turned the port 24 round to cut off communication between the conduits 22 and 25. The same has occurred at the right-hand end of the drawing to cut off communication between the conduits 26 and 25. In this new setting of the ports 24 the conduits 22 and 26 are blanked off and a hydraulic lock is provided serving to maintain the landing elements in the drift setting they have acquired during the initial stage of landing.

Figure 5:
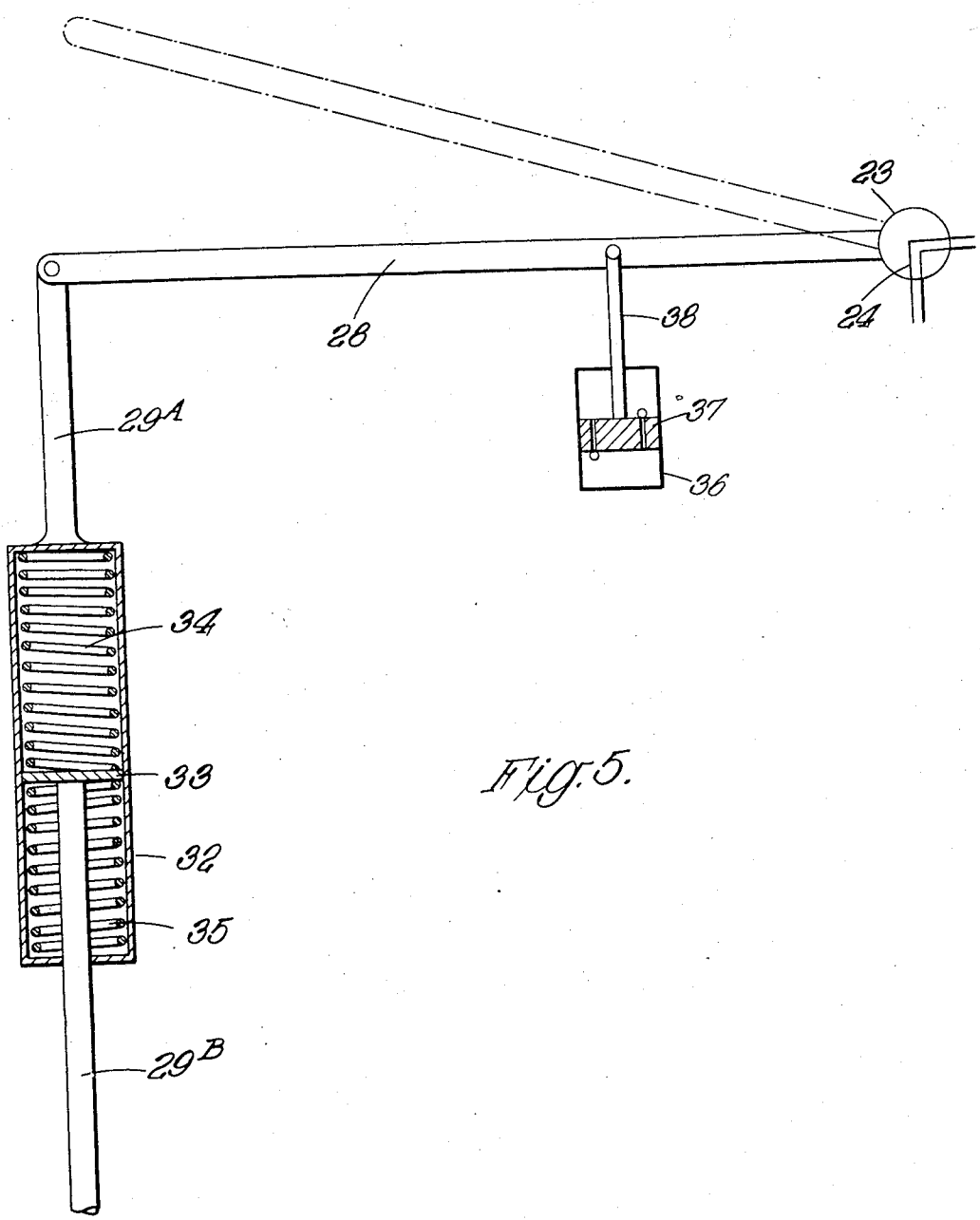
Figure 5 is a detail view illustrating the nature of a by-pass valve which achieves a predetermined time-lag in the sequence of operations as between the stages illustrated with reference to Figures 3 and 4.

In order to relieve the landing elements of the necessity of achieving the requisite drift setting excessively rapidly immediately on making contact with the ground, the valves 23 operate to introduce a time-lag before breaking communication of the jack conduits 22 and 26 with the interconnecting conduit 25. One convenient time-lag mechanism is shown with reference to Figure 5. In this case the connecting link 29 is divided into two strut parts 29A and 29B. The strut part 29A carries the cylinder 32 with respect to which the part 29B slides. The head 33 on the strut part 29B slides within the cylinder 32 with the part 29B and separates the two compression springs 34 and 35. The strut part 29A is connected at its upper end to the lever 28 which directly actuates the valve 23 for appropriately setting the port 24. The rate of rise and fall of the lever 28 is restricted by the dashpot cylinder 36 and co-operating ported piston 37. The dashpot cylinder 36 is fixed and the ported piston 37 is connected to the valve-actuating lever 28 by the plunger rod 38. The strut part 29B is connected to the bracket 30 referred to in connection with Figures 3 and 4, and it will be realised that immediately the landing elements make contact with the ground as the aircraft alights, the spring 34 is compressed due to the leg part 31 yielding with respect to the part 27. The restriction ports of the piston 37 are chosen of such dimensions as to prevent any substantial movement of the valve-actuating lever 28 immediately on alighting, and the result is that the valve 23 moves relatively slowly under the influence of the compression stored in the spring 34. In the same way the damping afforded by the dashpot co-operating with the ported piston 37 operates to prevent the valve 23 moving to establish flow through the port 24 on any momentary relief of load such as might occur during taxiing operations.

The device indicated in the drawings by the reference numeral 39 in the pipelines 12 and 13 is simply to afford compensation of the series connection between the various sets of jacks. The device 39 may include a thermostat control to compensate for temperature changes and also a replenishment valve and reservoir.

Any convenient form of indicator device may be provided to give the pilot an indication of the setting of the landing elements.

What we claim is:

1. In aircraft alighting gear having landing elements directionally settable in parallel relationship for cross wind landing and take-off, mounting means for each landing element comprising a castorable part and a fixed anchorage, a landing element mounted by the castorable part on each mounting, said landing elements castoring during an initial stage of a landing operation to achieve alignment with the direction of taxiing travel, steering means operative between the castorable part of each mounting and the fixed anchorage, means of operative interconnection effective between the several steering means, and locking means operative to couple the castoring part of each mounting to its associated steering means subsequent to the achieving of alignment of the landing elements with the direction of taxiing travel.

2. In aircraft alighting gear having plural landing elements directionally settable in parallel relationship for cross wind landing and take-off, mounting means for each landing element including a pair of cylinders, a piston in each cylinder, a castorable part, and links connecting opposite extremities of the castorable part with the respective pistons, a landing element mounted on each castorable part, fluid conduits connecting opposite ends of the cylinders of each pair so that the respective pistons are urged in opposite directions in response to fluid flow, fluid conduits connecting the pairs of cylinders in series in a closed circuit so that corresponding pistons of each pair are always moved in the same direction, and valve means to check fluid circulation in said circuit.

3. Aircraft alighting gear as set forth in claim 2 further comprising, means responsive to the assumption of the aircraft weight by its landing elements for closing said valve means, and means acting on said last named means to delay the action thereof for a predetermined period whereby in landing the landing elements may assume a position consistent with cross wind conditions before the fluid circuit is closed by the valve means.

4. Aircraft alighting gear as set forth in claim 2 further comprising, a member fixed to the aircraft body, another member normally extended but yieldable under landing and taxiing loads to move in a direction toward said fixed member, said valve means being mounted on said fixed member, a valve operating linkage connecting said valve means and said yieldable member so that the valve means is open when the yieldable member is in its normal position, and damping means acting on the valve operating linkage to afford a predetermined time lag intermediate the yielding movement of the yieldable member and the closing of the valve means.

5. Aircraft alighting gear as set forth in claim 2 further comprising, a member fixed to the aircraft body, another member normally extended but yieldable under landing and taxiing loads to move in a direction toward said fixed member, said valve means being mounted on said fixed member, a control lever for operating said valve means, a resiliently compressible shaft pivotally connected to said control lever, a link pivotally connected to said compressible shaft and attached to the yieldable member, the link-lever-shaft connection being such that the valve means is held in open position when the yieldable member is in its normal extended position, and a dash-pot connected to said control lever and serving to damp movement of the latter, whereby yielding movement on the part of said yieldable member will compress said resiliently compressible shaft to store energy which, acting against the dash-pot, will close the valve means after a predetermined time period has elapsed.

OWEN FINLAY MACLAREN.
LESLIE EVERETT BAYNES.